(12) United States Patent
Hunt

(10) Patent No.: US 6,279,937 B1
(45) Date of Patent: Aug. 28, 2001

(54) INTERMEDIATE SHAFT PLATE FOR TRANSMISSION CONTROL LINKAGE

(75) Inventor: Kenneth Edward Hunt, Oconomowoc, WI (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/358,185

(22) Filed: Jul. 20, 1999

(51) Int. Cl.[7] .................................................. B60K 17/00
(52) U.S. Cl. ......................... 280/336; 180/333; 74/474; 74/474.01; 74/481
(58) Field of Search .................................. 180/336, 333; 74/474, 474.01, 481

(56) References Cited

U.S. PATENT DOCUMENTS

| | | | |
|---|---|---|---|
| 4,221,277 | * 9/1980 | Mastropieri | 74/474 |
| 4,346,617 | * 8/1982 | Schroeder et al. | 74/474 X |
| 4,620,575 | * 11/1986 | Cuba et al. | 180/336 |
| 4,759,417 | 7/1988 | Wanie et al. | 180/6.34 |
| 4,883,137 | 11/1989 | Wanie et al. | 180/6.34 |
| 5,022,477 | 6/1991 | Wanie | 180/6.34 |
| 5,048,638 | 9/1991 | Duncan et al. | 180/307 |
| 5,228,360 | 7/1993 | Johnson | 74/512 |
| 5,509,496 | 4/1996 | Erickson et al. | 180/307 |
| 5,586,955 | 12/1996 | Wanie | 477/99 |
| 5,842,378 | 12/1998 | Zellmer | 74/473.17 |

* cited by examiner

*Primary Examiner*—Lanna Mai
*Assistant Examiner*—Toan To

(57) ABSTRACT

An intermediate shaft plate is provided for an assembly for controlling the ground speed of a vehicle having an operator seat, an engine and a variable speed transmission coupled for driving a pair of ground wheels. The transmission is selectively movable among neutral, forward and reverse drive positions. A transmission control shaft is coupled to the transmission for selectively controlling said transmission such that said vehicle is driven in either a forward or a reverse direction. A forward foot control pedal and a reverse foot control pedal are connected to a foot control rod and a hand control lever is connected to a hand control rod. The intermediate shaft plate is connected to the hand control rod, the foot control rod and the transmission control shaft for coupling the forward and reverse control pedals and the hand control lever to the transmission.

6 Claims, 10 Drawing Sheets

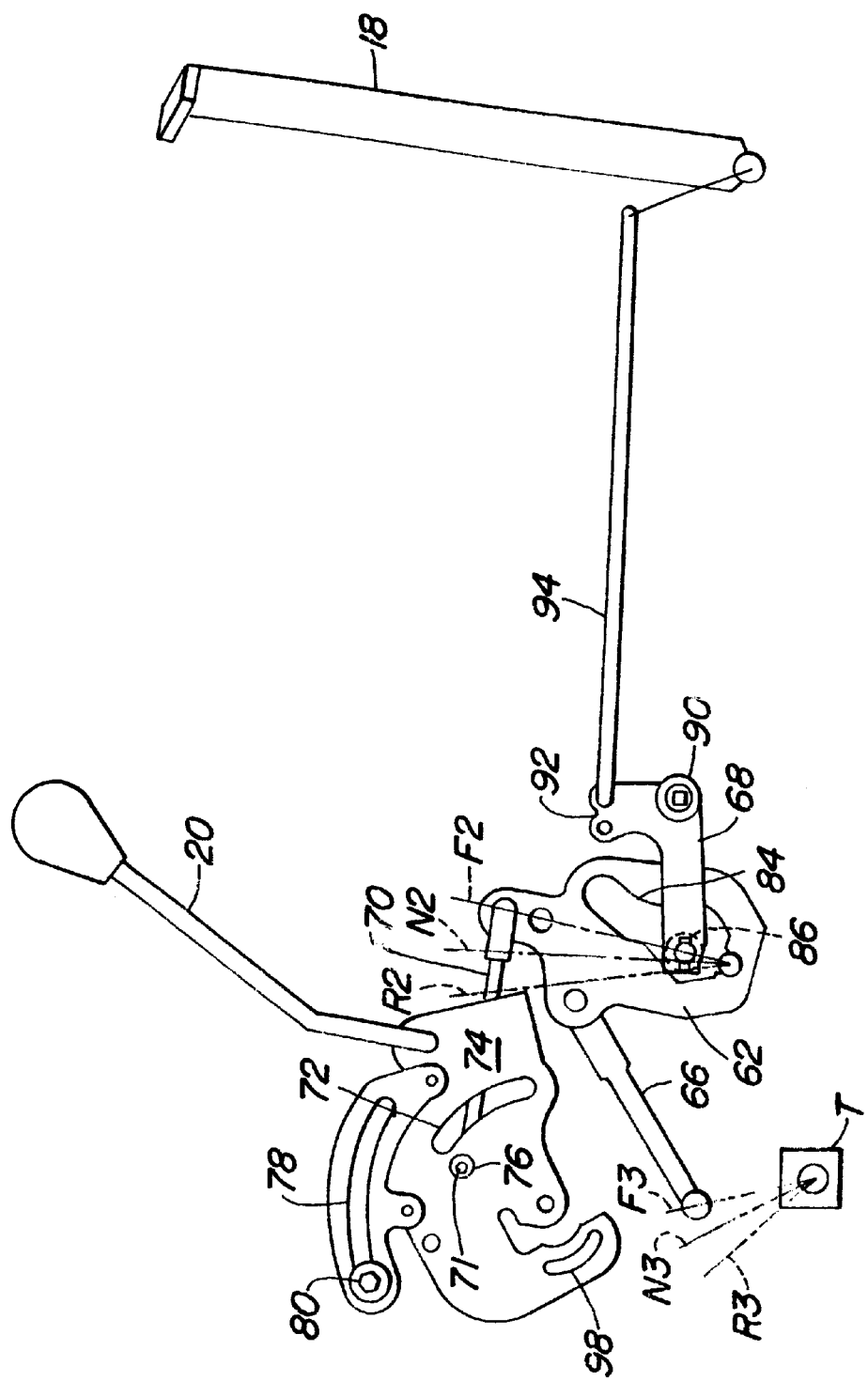

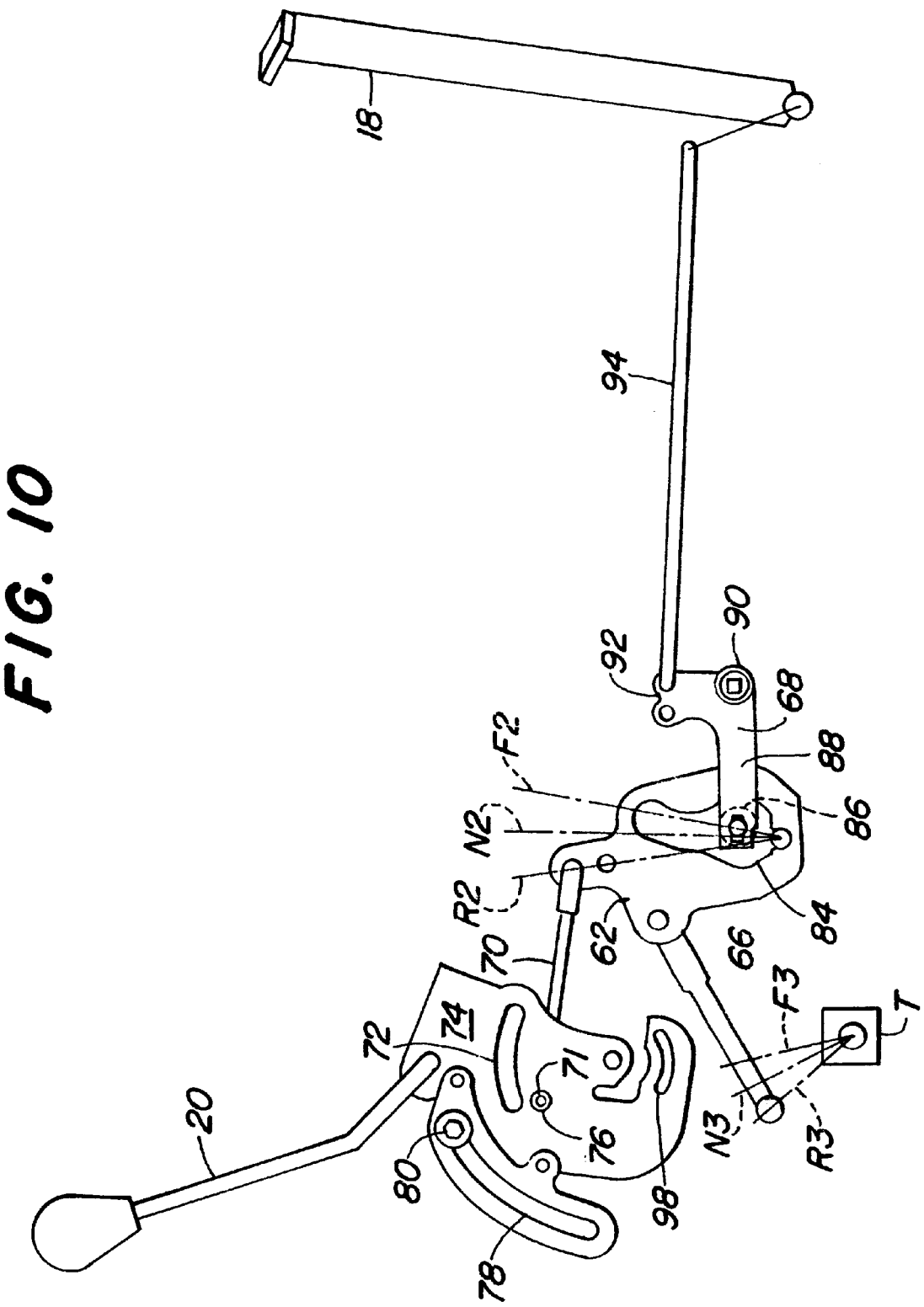

INTERMEDIATE SHAFT PLATE FOR TRANSMISSION CONTROL LINKAGE

BACKGROUND OF THE INVENTION

1. Field of the Invention

The present invention relates to an improved assembly for controlling the ground speed of an off-road vehicle and, more specifically, relates to an improved transmission linkage which provides an intermediate shaft plate which serves as a centralized location for joining a ground speed and direction control assembly capable of both hand and foot control, as well as a neutral return assembly to a transmission.

2. Description of Related Art

It is well known to provide off-road vehicles, specifically lawn tractors, lawn and garden tractors, and front-mount mowers with systems for controlling their ground speed. Typically, variable speed transmissions such as hydrostatic transmissions or continuously variable transmissions utilized in off-road vehicles such as those listed above have used different combinations of hand and foot controls to select the direction of travel and to control the relative vehicle speed.

Conventional systems utilized to control the ground speed of the types of off-road vehicles mentioned above include a hand lever controls, a treadle pedal, or a dual pedal side-by-side system (such as that disclosed in U.S. Pat. No. 4,759,417 dated Jul. 26, 1988 issued to Wanie et al., the disclosure of which is hereby incorporated by reference).

The pedal systems are often coupled with a hand-operated "cruise control" lever which is generally used to maintain a specified forward speed, eliminating the need for constant application of foot pressure to keep the vehicle moving forward at a desired rate of speed.

Off-road vehicles are also commonly provided with a neutral return which will place a transmission in neutral (or disengage the transmission) when a brake is applied.

The various systems involved in controlling a variable speed transmission of such a vehicle require a number of mechanical linkages. Where foot and hand controls are used in conjunction with a neutral return, the linkages and their attachments to each other are often complex, difficult to service and to modify for special needs of operators.

Accordingly, there is a need for an improved assembly for controlling the ground speed and direction of travel of maneuverable off-road vehicles having variable speed transmissions such as variable speed hydrostatic transmissions; which provides a centralized point of attachment to the transmission of hand and foot controls, as well as a neutral return system.

SUMMARY OF THE INVENTION

According to the present invention, an off-road vehicle is provided with a transmission control linkage including an intermediate shaft plate which eliminates the need for multiple and complex connections to coordinate the functions of the ground speed and direction control assembly and a neutral return assembly with a variable speed transmission.

An intermediate shaft plate is utilized as a central point of attachment to a transmission for a control rod employed for hand and/or foot pedal controls, a neutral return. The central point of attachment aids in the conversion of the transmission linkage from foot pedal to hand lever control. The intermediate shaft plate coordinates the functions of the speed and direction control assembly and the neutral return and transmits the output of both assemblies to the transmission by a single control rod attached to the transmission.

In a preferred embodiment of the present invention, a ground speed and direction control assembly for a vehicle is provided which includes a system of linkages which are adaptable for use with both hand and foot controls with a simple, straightforward conversion. The foot controls are provided which include a forward pedal and a reverse pedal, as well as a brake pedal. When the foot controls are in use, the unit may also include a cruise control lever which eliminates the need for an operator to maintain constant pressure on a pedal. The foot controls are coupled to a control shaft which in turn is coupled to a variable speed transmission so that the vehicle speed may be varied by changing foot pressure on the pedals. A hand lever is included in the assembly and may be used as a cruise control to maintain travel speed without having to hold the forward pedal down. When used as a cruise control, the hand lever is operatively coupled to the transmission by a lost motion connection which enables an operator to press further on the forward foot pedal to achieve speed beyond the cruise control setting. The cruise control operates only for forward travel. The ground speed and direction control assembly may be converted to hand controls by substituting a tight-fit connection between the hand lever and the transmission in place of a lost-motion connection used for the cruise control function.

A neutral return assembly is also provided so that, when the brake pedal is depressed, the transmission will return to its neutral position.

In the preferred embodiment, an intermediate shaft plate which operates as a centralized connection between the foot pedals (forward, reverse and brake), hand lever, neutral return assembly and the transmission is provided to which control rods from the foot pedals, a hand lever and the transmission are pinned. The intermediate shaft plate includes an internal cam profile which may be engaged by a bearing attached to a neutral return arm included in the neutral return assembly. Actuation of the brake pedal rotates the neutral return arm, whose bearing forces the intermediate shaft plate into a neutral position as the bearing follows the internal cam profile. The neutral position of the intermediate shaft plate corresponds to a neutral position of the transmission due to interconnection of the transmission and the intermediate shaft plate by the transmission control rod.

BRIEF DESCRIPTION OF THE DRAWINGS

FIG. 9 is a schematic diagram of the ground speed and direction control assembly of FIG. 8 with the transmission is in a maximum forward position; and FIG. 10 is a schematic diagram of the ground speed and direction control assembly of FIG. 8 with the transmission is in a maximum reverse position.

DESCRIPTION OF THE PREFERRED EMBODIMENT

Figure 1:
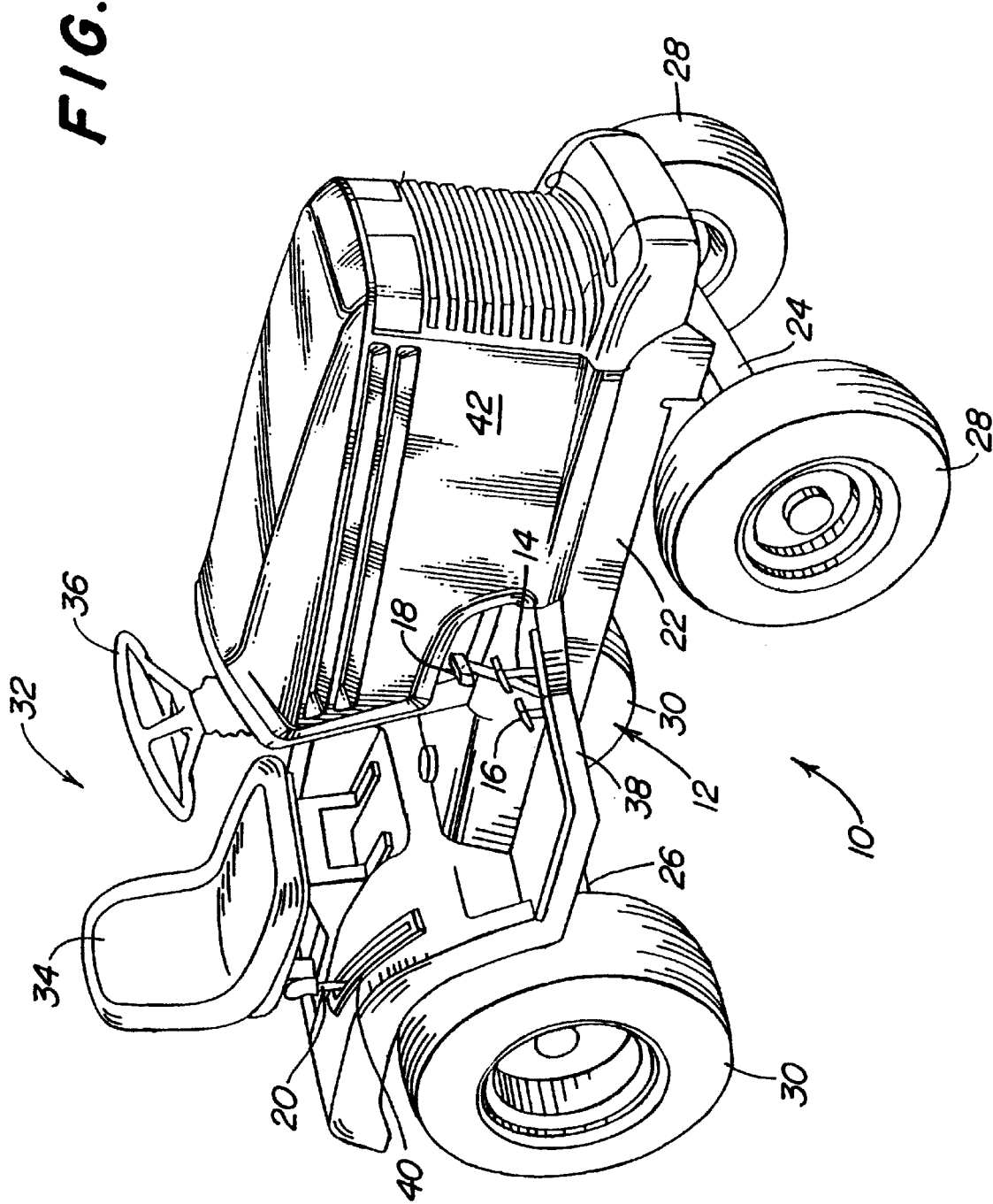
FIG. 1 is a right front elevated perspective view of a representative lawn and garden tractor incorporating a ground speed and direction control assembly according to the present invention adapted for foot pedal control.

FIG. 1 illustrates a representative lawn and garden tractor 10 incorporating a linkage forming a ground speed and direction control assembly 12 which includes an inboard forward pedal 14, an outboard reverse pedal 16, a brake pedal 18 and a hand lever 20. As shown in FIG. 1 the representative lawn and garden tractor 10 consists of a frame 22, a front axle 24 and a rear axle 26. Two front wheels 28 are mounted on the front axle 24 and two rear wheels 30 are mounted on the rear axle 26. The tractor 10 may be provided with an implement such as a mowing deck (not shown) which may be mounted on the frame 22. An operator's station 32 which includes a seat 34, a steering wheel 36 and the hand-operated lever 20, which may be utilized as a cruise control, is operatively positioned on the vehicle 10. A forward portion of the operator station 32 includes a foot platform 38 which accommodates foot controls including the forward and reverse pedals 14, 16 and the brake 18.

The speed and direction control assembly 12 is operatively connected to a variable speed transmission which includes a hydrostatic transmission (represented schematically as T in FIGS. 3–10). The hand lever 20 projects through a quadrant 40 which includes a legend to indicate the position of the lever 20 relative to the speed of the tractor 10. The typical lawn and garden tractor 10 also includes an engine (not shown) and a radiator (not shown), enclosed within a hood 42.

Figure 2:
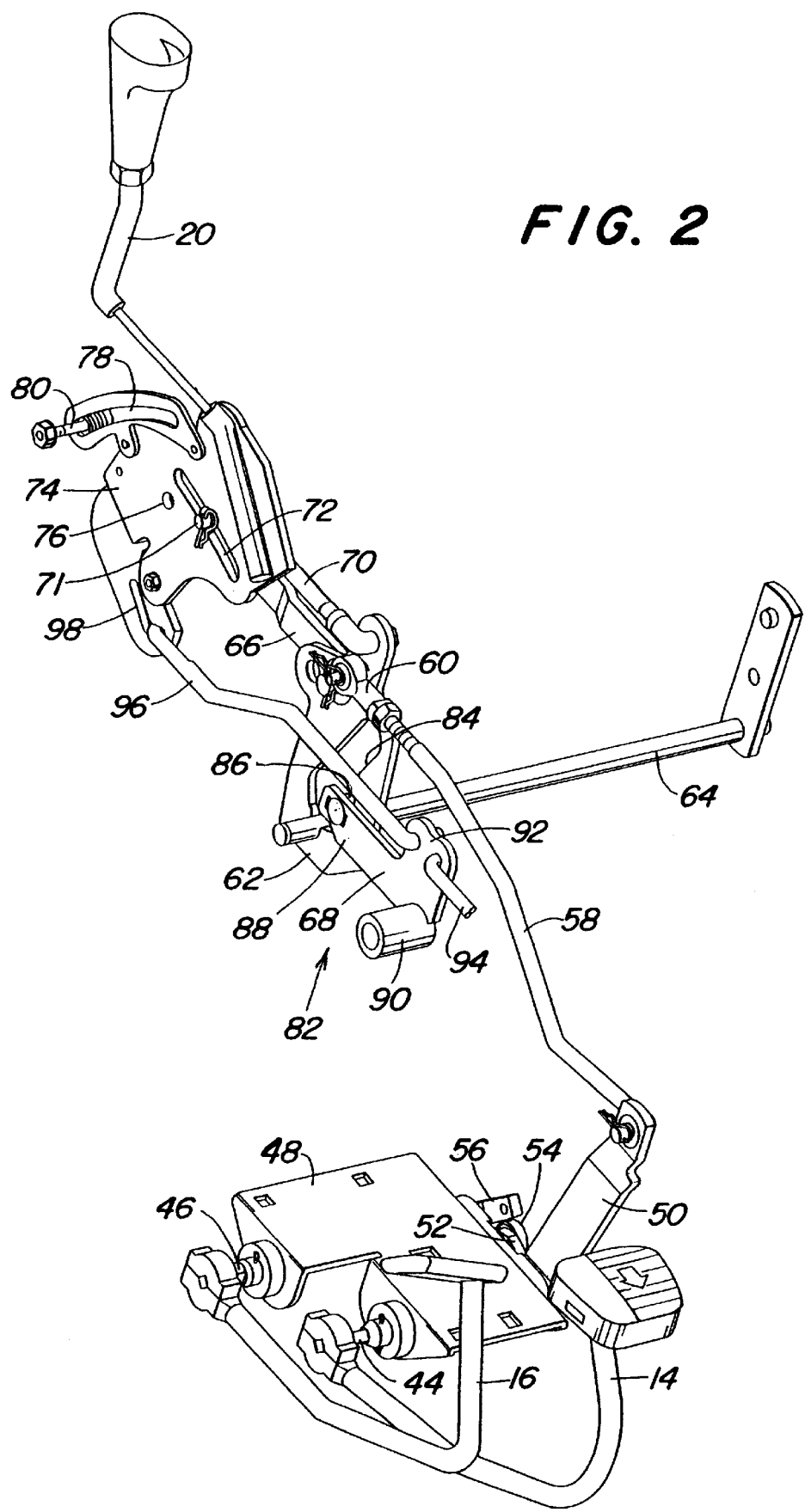
FIG. 2 is an elevated partial perspective view of the ground speed and direction control assembly according to a preferred embodiment of the present invention.

In FIGS. 2–10, the improved ground speed and direction control assembly 12 for the representative lawn and garden tractor 10 is illustrated. In FIGS. 2–7, the assembly 12 is adapted for foot pedal control with a hand-operated cruise control, whereas in FIGS. 8–10, the assembly 12 is adapted for hand lever control. Referring now to FIG. 2, a partial perspective view of the ground speed and direction control assembly 12 is shown. The forward pedal 14 is clamped to a forward pedal shaft 44 so that foot pressure on the forward pedal 14 will result in swinging movement of the forward pedal shaft 44. The reverse pedal 16 is similarly clamped to a reverse pedal shaft 46. The forward and reverse pedal shafts 44, 46 are carried on a bracket 48. The forward pedal shaft 44 includes a pedal control arm 50 which swings therewith and includes a rearward extension 52 to which a bearing 54 is mounted. The reverse pedal shaft 46 includes a reverse pedal shaft arm 56 which swings with the reverse pedal shaft 46 and engages the bearing 54 to cause the forward pedal shaft arm 50 to rotate in a direction opposite the direction of rotation which is caused by actuation of the forward pedal 14. In this way, the pedal control arm 50, which is secured to one end of the pedal control arm 50 can move the forward/reverse control rod 58 in either a forward or rearward direction. The arm 50 will pull forward on the rod 58 when the forward pedal 14 is actuated and will push rearward on the rod 58 when the reverse pedal 16 is actuated.

The forward/reverse control rod 58 is connected at its rearward end to a ball joint 60 in turn which is pinned to an intermediate shaft plate 62. The intermediate shaft plate 62 is welded to a transverse intermediate shaft 64 supported by the frame 22 for fore and aft swinging motion thereabout. The intermediate shaft plate 62 serves as a centralized connecting link between the transmission T, foot control pedals 14, 16, hand lever 20 and brake 18 and is used with either the foot control linkage or hand control linkage to actuate the swash plate of the transmission T. A transmission control rod 66 is pinned to the intermediate shaft plate 62, operably connecting the intermediate shaft plate 62 and components attached thereto to the swashplate of the hydrostatic transmission T. It will be seen that the intermediate shaft plate 62 represents a centralized connecting point for various linkages, eliminating the need for multiple separate connections to the transmission T.

Also attached to the intermediate shaft plate 62 are a neutral return arm 68 and a hand lever rod 70. When the hand lever 20 is utilized as a cruise control lever, the hand lever rod 70 is secured at its end 71 opposite the intermediate shaft plate 62 to a lost motion cruise control lever slot 72 formed within a hand lever plate 74. The hand lever plate 74 is a welded to the hand lever 20 and swings about its pivotal connection as the hand lever 20 is moved fore and aft. The hand lever plate 74 is also provided with a tight-fit hole 76 for receiving the end 71 of the hand lever rod 70 when the hand lever 20 is used instead of the foot controls for controlling speed of the vehicle 10. A cruise lever friction slot 78 is additionally provided in the hand lever plate 74. The cruise lever friction slot 78 20 accommodates a friction device such as a bolt and friction washer assembly 80 which is fixed relative to the frame 22 but moves within the slot 78, allowing the hand lever 20 to rotate. When tightened sufficiently against the hand lever plate 74, the assembly 80 serves to retain the hand lever 20 in any desired position along the slot 78, eliminating the need far A preferred embodiment of the ground speed and direction control assembly 12 additionally includes a neutral location and return assembly 82 for establishing a neutral position and for returning the transmission T to its neutral position N3 as would occur when the brake pedal 18 is actuated. The illustrative embodiment of the neutral location and return assembly 82 shown in FIGS. 2–10 comprises an internal cam profile 84 within a central portion of the intermediate shaft plate 62 and a cam profile follower bearing 86 attached to a first end portion 88 of the neutral return arm 68. The neutral return arm 68 is swingably mounted at a pivot point 90 and includes a second end portion 92 to which a neutral return rod 94 is fastened. The neutral return rod 94 is coupled at its other end to the brake pedal 18. The first and second end portions 88, 92 of the neutral return arm 68 form an angle with the pivot point 90 so that the neutral return arm 68 operates as a bell crank, causing the bearing 86 to rotate into engagement with the internal cam profile 84 as the brake pedal 18 is engaged. As the bearing 86 follows the internal cam profile 84, the intermediate shaft plate 62 and the swashplate control shaft 87 in the transmission T are caused to swing to change the position of the transmission T to neutral.

If the hand lever 20 is used as a cruise control with the foot pedal controls, a cruise control interlock rod 96 is fastened at one end to the second end portion 92 of the neutral return arm 68 and at another end to an interlock slot 98 formed in the hand lever plate 74. The cruise control interlock rod 96 serves to return the hand lever 20 to a cruise control off position as the brake pedal 18 is engaged and the transmission T is shifted to its neutral position N3.

As shown in FIGS. 2–7, during operation of the tractor 10 when the speed and direction control assembly 12 is set up to be operated with foot controls, the internal transmission T engagement is generally controlled by the foot control pedals (forward reverse and brake) 14, 16, 18 through the control linkage herein described.

The forward and reverse pedals 14, 16 pivot the forward and reverse pedal shafts 44, 46 mounted in the bracket 48 and swing the pedal control arm 50 forwardly or rearwardly between forward F1, neutral N1 and reverse R1 positions. The pedal control arm 50 either pulls or pushes the forward/reverse control rod 58. In turn, the forward/reverse rod 58 pivots the intermediate shaft plate 62 forward and rearward between forward F2, neutral N2 and reverse R2 positions. The transmission control rod 66 connects the intermediate shaft plate 62 to the transmission T. As the intermediate shaft plate 62 rotates forward, the transmission T is shifted into forward F3. As the intermediate shaft plate 62 rotates rearward into reverse R2, the transmission T is shifted into reverse R3.

It may therefore be seen that the ground speed and direction assembly 12 shown in FIGS. 2–7 provides mechanical means of operating a forward/reverse control lever on the transmission through the forward and reverse pedals 14, 16, and a means of maintaining forward speed without holding the forward pedal 14 down when using the hand lever 20 as a cruise control. Through the brake pedal 18, the ground speed and direction assembly 12 also engages a transmission brake (not shown) which may be, for example, a wet disk brake (not shown), and ensures that the brake is released when the forward or reverse pedals 14, 16 are engaged, and that the transmission will return to neutral when the brake pedal 18 is pressed.

Figure 3:
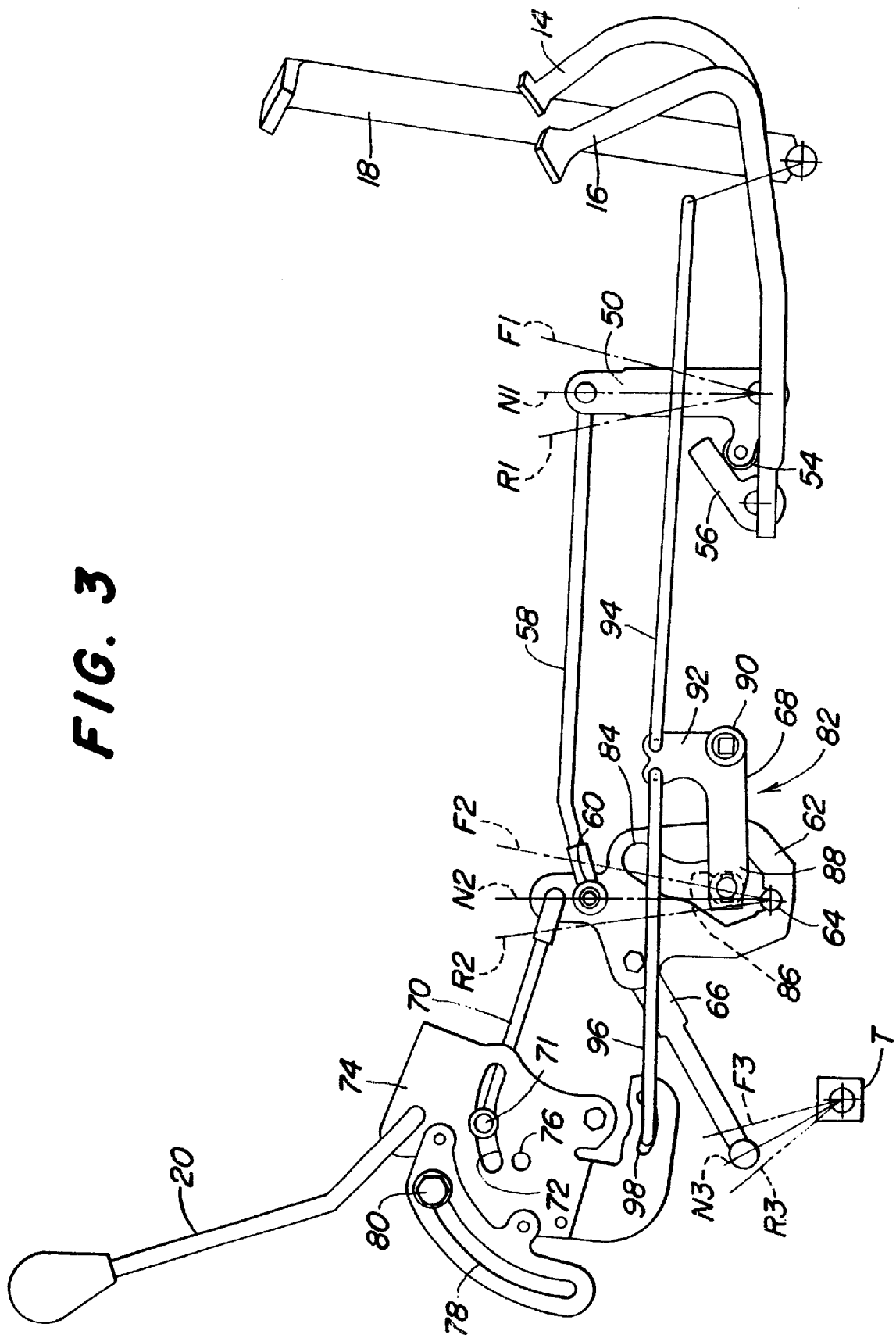
FIG. 3 is a schematic diagram of the ground speed and direction control assembly Of FIG. 2 adapted for foot pedal control with the transmission is in a neutral position.

Referring now to FIG. 3, the speed and direction control assembly 12 is shown adapted for foot pedal control. In FIG. 3, the linkages of the assembly 12 are shown in the positions whey would occupy when the transmission controls are in neutral. The various linkages of the speed and direction control assembly 12 are illustrated with the transmission control rod 66 is in its neutral position N3, the forward or reverse pedals 14, 16 are released.

If the transmission T is in in forward or reverse F3, R3 and the foot pedals 14, 16 are subsequently disengaged, a spring inside the transmission T (not shown) and/or a spring acting on the foot pedals 14, 16 returns the transmission control rod 66 to its normal, neutral position N3. As the transmission control rod 66 is moved to its neutral position N3, the transmission control rod 66 moves the intermediate shaft plate 62 to the neutral position, causing the forward/reverse rod 58 to move the pedal control arm 50 and forward and reverse pedals 14, 16 to the neutral position N1.

Figure 4:
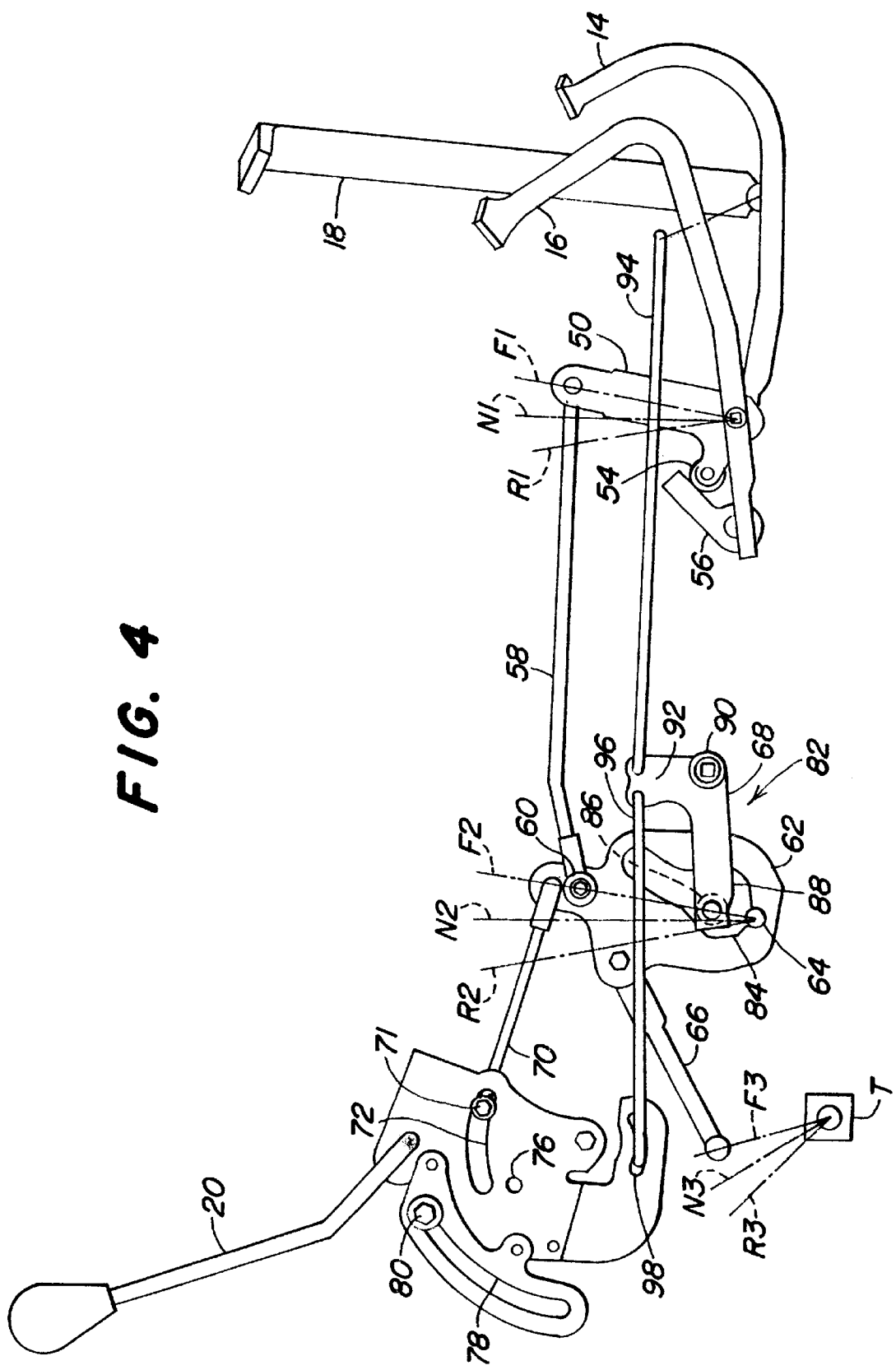
FIG. 4 is a schematic diagram of the ground speed and direction control assembly of FIG. 2 adapted for foot pedal control with the transmission is in a maximum forward position.

FIG. 4 shows the speed and direction control assembly 12 adapted for foot pedal control wherein the transmission T is moved to its maximum forward position F3. As the forward pedal 14 is depressed, it swings the forward pedal shaft 44 clockwise as viewed in FIG. 4 and swings the pedal control arm 50 forward to its forward position F1. The pedal control arm 50 pulls the forward/reverse control rod 58. In turn, the forward/reverse rod 58 pivots the intermediate shaft plate 62 forward to its forward position F2. The transmission control rod 66 connects the intermediate shaft plate to the transmission T. As the intermediate shaft plate 62 rotates forward, the transmission control rod 66 is shifted into forward to its forward position F3.

Although the assembly 12 is shown wherein the transmission control rod 66 in its maximum forward position F3, the transmission T is preferably infinitely variable so that the positions between the neutral and forward positions N3, F3 of the transmission control rod 66 represent an infinite number of forward ground speeds of the vehicle 10 between neutral and the maximum forward speed of the vehicle 10.

Where, as shown in FIG. 4, the hand lever 20 (the cruise control lever) is in an OFF position, the end 71 of the hand lever rod 70 is able to move freely in the cruise control lever slot 72, and movement of the forward pedal 14 is not restricted by the hand lever 20 (cruise control lever).

Figure 5:
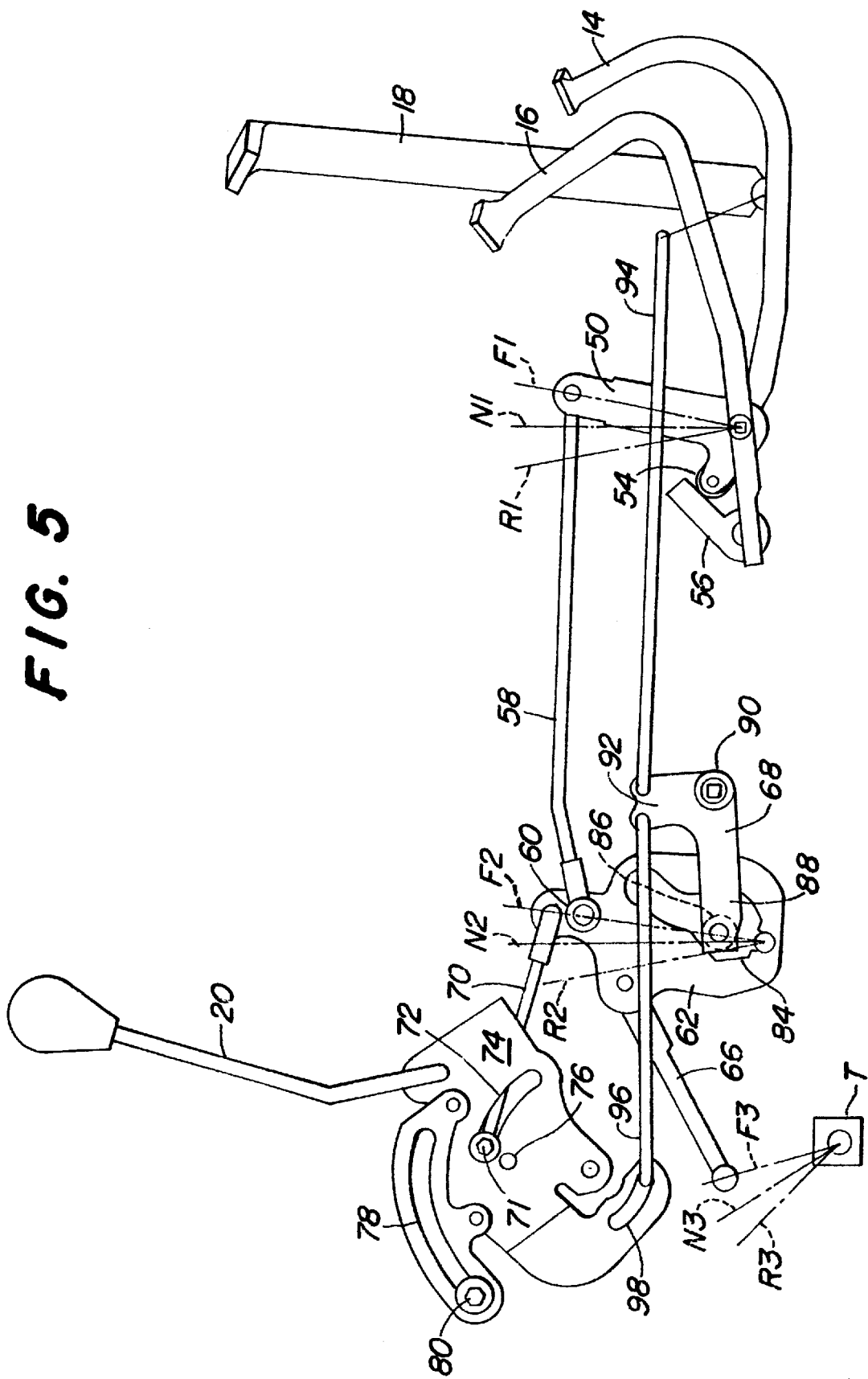
FIG. 5 is a schematic diagram of the ground speed and direction control assembly of FIG. 4 adapted for foot pedal control with the hand-operated cruise control lever is in a maximum speed position.

FIG. 5 diagrams schematically the ground speed and direction control assembly 12 adapted for foot pedal control wherein the hand lever 20, serves as a cruise control lever, and is moved forwardly to set the forward cruise speed at its maximum. The cruise control is used to maintain travel speed without having to hold the forward pedal 14 down. The cruise control operates only for forward travel of the tractor 10. The hand lever 20 acts as a cruise control lever whenever, as shown in FIGS. 2–7, the end 71 of the hand lever rod 70 is positioned in the cruise control lever slot 72 of the hand lever plate 74 rather than in the tight-fit hole 76.

In FIG. 5, the cruise control holds the transmission control rod 66 in a forward position (between its neutral and maximum forward positions N3, F3). The hand lever rod 70 connects the hand lever 20 (cruise control lever) to the intermediate shaft plate 62. When the cruise control is engaged, the hand lever rod 70 is moved forward, rotating the intermediate shaft plate 62 forward. The bolt and friction washer assembly 80 holds the hand lever 20 (cruise control lever) in the set position.

As the hand lever 20 (cruise control lever) is moved forward it pivots and the rearward end 71 of the hand lever rod 70 slides rearward in the cruise control lever slot 72. When the rear of the slot 72 abuts the end 71 of the hand rod lever 70, and the hand lever 20 (cruise control lever) is moved farther forward, the hand lever rod 70 is pushed forward. The hand lever rod 70 thereafter pushes the top of the intermediate shaft plate 62 forward towards its maximum forward position F2. The transmission control rod 66 connects the intermediate shaft plate 62 to the transmission T. As the intermediate shaft plate 62 rotates forward, the transmission control rod 66 is shifted toward its maximum forward position F3.

Cruise control may be set by moving the hand lever 20 (cruise control lever) forward until the ground speed of the tractor 10 is set; or, the forward pedal 14 may be depressed to attain the ground speed desired and the maintained by moving the hand lever 20 (cruise control lever) forward.

When the brake pedal 18 is depressed, the neutral return rod 94 is pulled forwardly so that the cruise control interlock rod 96 is pulled forward until it encounters the end of the interlock slot 98 in the hand lever plate 74. When the end of the interlock slot 98 abuts the end of the rod 96, the hand lever 20 (cruise control lever) is pulled back to its off position (shown in FIG. 3).

When cruise control is not in use, the hand lever 20 should be returned manually to its off position. Otherwise, the hand lever 20 may restrict travel of linkage connected to the reverse pedal 16, and reverse speed of tractor may be too slow.

Figure 6:
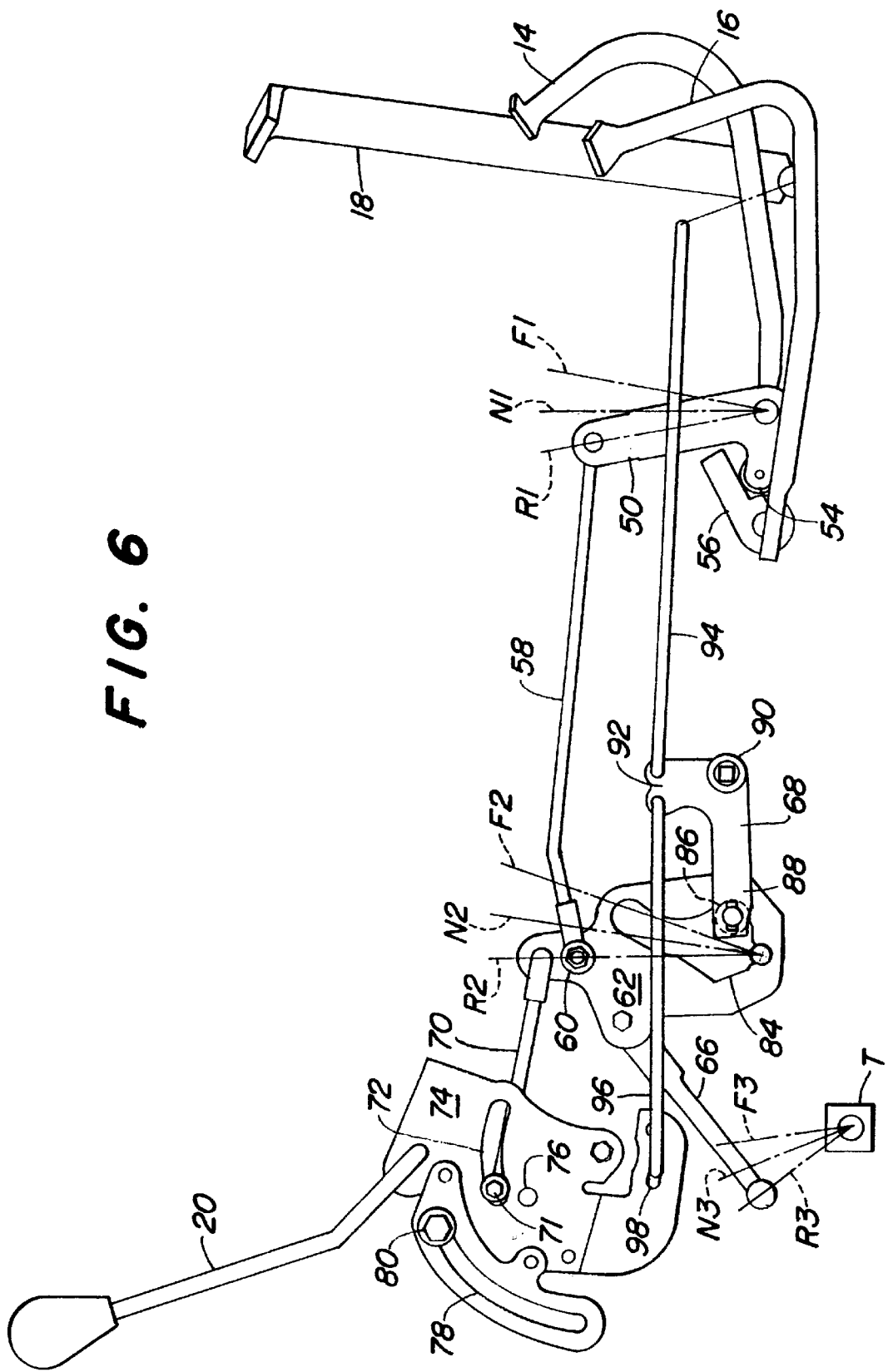
FIG. 6 is a schematic diagram of the ground speed and direction control assembly of FIG. 2 adapted for foot pedal control with the transmission is in a maximum reverse position.

Referring now to FIG. 6, the speed and direction control assembly 12 is illustrated with foot pedal controls and the swashplate of the transmission T is moved to its maximum reverse position R3. When the reverse pedal 16 is depressed, the transmission control rod 66 is moved to its maximum reverse position R3 and the transmission T engages in reverse drive.

The reverse pedal 16 is coupled to the reverse pedal shaft arm 56, which presses down on a the bearing 54 on a rearward extension 52 of the pedal control arm 50. When the rearward extension 52 of the pedal control arm 50 is pushed down, the top of the pedal control arm 50 rotates rearward to its maximum reverse position R1. The pedal control arm 50 pushes the forward/reverse control rod 58 rearward. This, in turn, pivots the intermediate shaft plate 62 rearward to its maximum reverse position R2.

The transmission control rod 66 connects the intermediate shaft plate 62 to the transmission T. As the intermediate shaft plate 62 rotates rearward, the transmission control rod is shifted to its maximum reverse position R3.

Although the assembly 12 is shown wherein the transmission control rod 66 in its maximum reverse position R3, the transmission T is preferably infinitely variable so that the positions between the neutral and maximum reverse positions N3, R3 of the transmission control rod 66 represent an infinite number of reverse ground speeds of the vehicle 10 between neutral and the maximum reverse speed of the vehicle 10.

Figure 7:
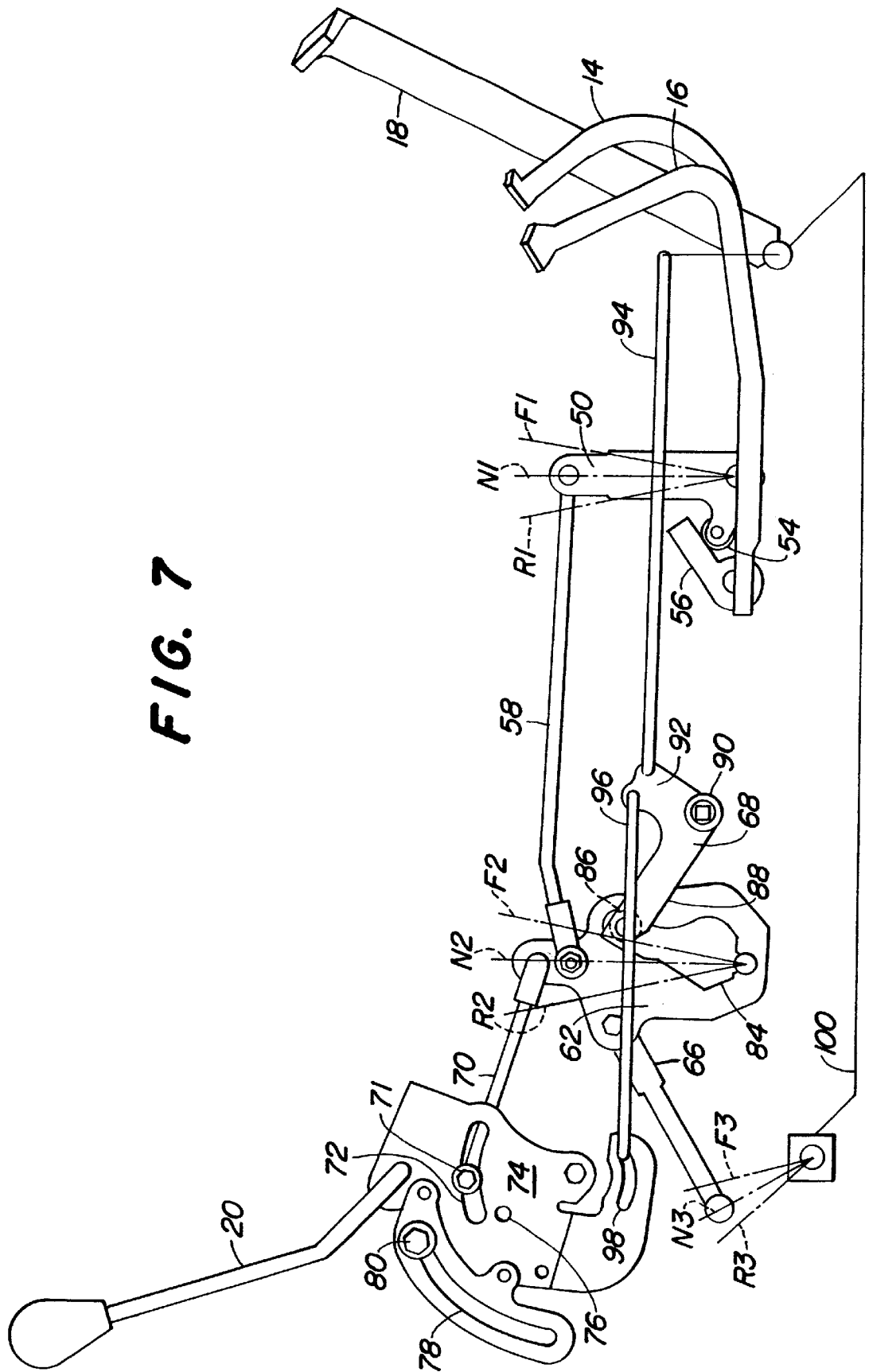
FIG. 7 is a schematic diagram of the ground speed and direction control assembly of FIG. 2 wherein the brake pedal is engaged, actuating a neutral return assembly.

FIG. 7 shows schematically the ground speed and direction control assembly 12 wherein the brake pedal 18 is engaged, actuating a wet brake in the transmission T (not shown) and a neutral return assembly 82. The brake pedal 18 functions, through a mechanical linkage, to return the intermediate shaft plate 62 and transmission T, and the hand lever 20 (cruise control lever) to neutral positions.

Depressing the brake pedal 18 pulls the neutral return rod 94 forward, rotating the neutral return arm 68. As the neutral return arm 68 rotates, the bearing 86 attached to the first end portion 88 of the neutral return arm 68 follows the inner cam profile 84 of the intermediate shaft plate 62 and moves the intermediate shaft plate 62 to its neutral position N2. The intermediate shaft plate 62 moves the transmission control rod 66 and places the transmission in its neutral position N3.

Also when the brake pedal 18 is depressed, the brake neutral return rod 94 is pulled forward and the neutral return rod 94 rotates the neutral return arm 68, the cruise control interlock rod 96 attached to the second end portion 92 of the neutral return arm 68 is pulled forward, rotating the hand lever 20 (cruise control lever) to its OFF position Depressing the brake pedal 18 simultaneously rotates a transmission brake arm 100 forward, causing wet brake pads internal to the transmission T stop the tractor 10.

Figure 8:
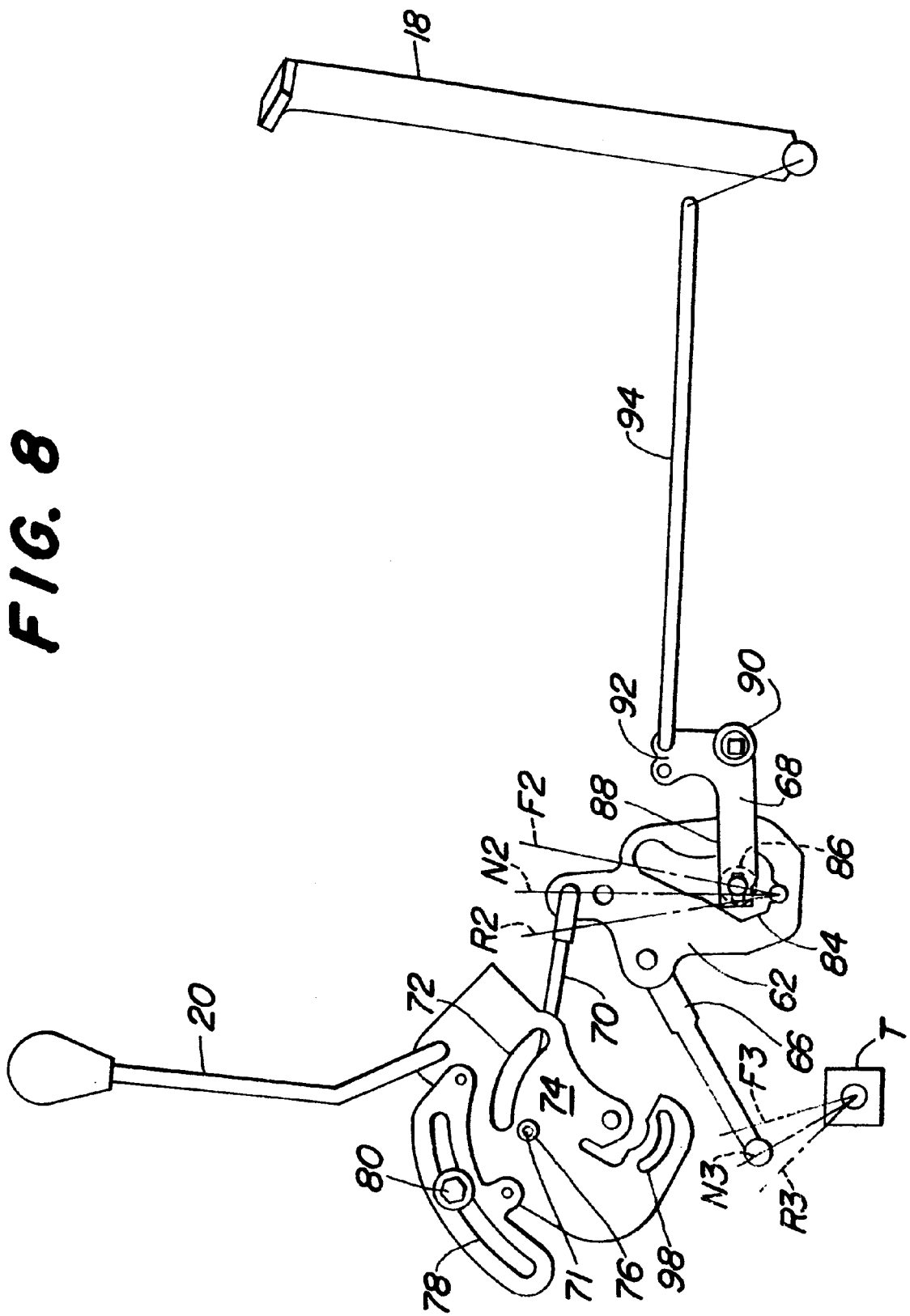
FIG. 8 is a schematic diagram of the ground speed and direction control assembly of FIG. 2 adapted for hand lever operation with the transmission is in a neutral position.

Referring now to FIG. 8, the ground speed and direction control assembly 12 is shown adapted for hand lever operation wherein the transmission T is in its neutral position N3. Adapting the ground speed and direction control assembly 12 for hand control allows the hand lever 20 to replace the function of the forward and reverse pedals 14, 16 so that forward movement of the hand lever 20 results in incremental forward pivoting of the intermediate shaft 62 and shifting of the transmission T is shifted toward its maximum forward position F3. As the hand lever 20 is pulled rearward into reverse, the intermediate shaft plate 62 rotates rearward and the transmission T shifted toward its maximum reverse position R3.

To convert the ground speed and direction assembly 12 from foot control to hand control, the end 71 of the hand lever rod 70 fastened to the hand lever plate 74 is moved from the cruise control lever slot 72 to the tight-fit hole 76. Some adjustment in length of the hand lever rod 70 may be required, and the quadrant 40 should be replaced so that its legend correctly reflects the neutral and reverse positions of the hand lever 20 when it is used for hand lever operation instead of cruise control. The cruise control interlock rod 96 should be removed when the hand lever 20 is used for hand control. If the cruise control interlock rod 96 were left connected to the assembly 12, the neutral return assembly 82 will attempt to return the hand lever 20 to its neutral position via the action of the bearing 86 on the internal cam profile 84 of the intermediate shaft plat 62, while the cruise control interlock rod 96 will try to return the hand lever 20 all the way rearward to its reverse position (shown in FIG. 10), resulting in possible damage to linkages and transmission controls. The forward and reverse pedals 14, 16 and forward/reverse control rod 58 become superfluous and are removed.

FIG. 9 shows the ground speed and direction control assembly 12 adapted for hand lever operation wherein the transmission is in its maximum forward position. When the hand lever 20 is moved to its forward position shown, the hand lever plate 74 rotates forward and the hand lever rod 70 pushes the top of the intermediate shaft plate 62 forward. The transmission control rod 66 connects the intermediate shaft plate 62 to the transmission T. As the intermediate shaft plate 62 rotates forward to its maximum forward position F2, the transmission control rod 66 shifted into forward to its maximum forward position F3. The bolt and friction washer assembly 80 holds the hand lever 20 in position.

Referring now to FIG. 10, the ground speed and direction control assembly 12 is shown adapted for hand lever operation wherein the transmission is in its maximum reverse position. When the hand lever 20 is moved to its reverse position shown, the hand lever plate 74 rotates rearward and the hand lever rod 70 pulls the top of the intermediate shaft plate 62 rearward to its maximum reverse position R2. As the intermediate shaft plate 62 rotates rearward, the transmission control rod 66 is shifted into its maximum reverse position R3.

When the brake pedal 18 is depressed, the neutral return rod 94 is pulled forward. The neutral return rod 94 rotates the neutral return arm 68. When the neutral return arm 68 rotates, the bearing 86 forces the intermediate shaft plate 62 back to its neutral position N2. The attached hand lever rod 70 is pushed backward, rotating the hand lever 20 to the neutral position (shown in FIG. 8).

Although the invention is described with reference to an illustrative embodiment, it will be understood by those skilled in the art that the invention may be advantageous in the form described as modified for use in other applications. The present invention should not be limited by the above-described embodiments, but should be limited solely by the claims that follow.

What is claimed is:

1. A vehicle having an operator seat, an engine, a variable speed transmission drivingly coupled to a pair of ground wheels, and an assembly for controlling the ground speed of the vehicle, said transmission being selectively movable among neutral, forward and reverse drive positions, said assembly comprising:

a transmission control shaft operatively connected to said transmission for selectively controlling said transmission such that said vehicle is driven in either a forward or a reverse direction;

a forward foot control pedal and a reverse foot control pedal, each being connected to a single foot control rod;

a hand control lever connected to a hand control rod; and an intermediate shaft plate connected to the hand control rod, the single foot control rod and the transmission control shaft for coupling the forward and reverse control pedals and the hand control lever to the transmission;

a brake coupled to a pair of wheels, a brake actuator connected to the brake for selectively stopping the vehicle, and a neutral return assembly operatively connected to the brake actuator and to the intermediate shaft plate for returning the transmission to its neutral position when the brake actuator is engaged.

2. A vehicle of claim 1 wherein the intermediate shaft plate has an internal cam profile and a neutral return assembly includes an arm pivotally mounted to the vehicle, said arm having a cam follower bearing at a first end thereof.

3. A vehicle having a foot control, a hand control and a variable speed transmission and intermediate shaft plate, a transmission linkage including a plurality of control rods each operatively coupled to one of the foot control, hand control and the variable speed transmission, said intermediate shaft plate comprising:

a center portion having material removed therefrom to form an internal cam profile;

a first end portion having first orifice for receiving a first one of the plurality of control rods; and a second end portion having a second orifice for receiving a second one of the plurality of control rods;

said intermediate shaft plate having a third orifice for receiving a third one of the plurality of control rods;

a brake coupled to a pair of wheels, a brake actuator connected to the brake for selectively stopping the vehicle, and a neutral return assembly operatively connected to the brake actuator and to the intermediate shaft plate for returning the transmission to its neutral position when the brake actuator is engaged.

4. The vehicle of claim 3 wherein the neutral return assembly including a cam follower bearing which engages the internal cam profile.

5. The vehicle of claim 3 wherein the shaft plate is pivotably mounted on a frame of the vehicle.

6. The vehicle of claim 5 wherein the first, second and third orifices form rigid connections between the shaft plate and the first, second and third ones of the plurality of control rods for effecting movement of the plurality of control rods as the shaft plate pivots.

* * * * *